Figure 1:
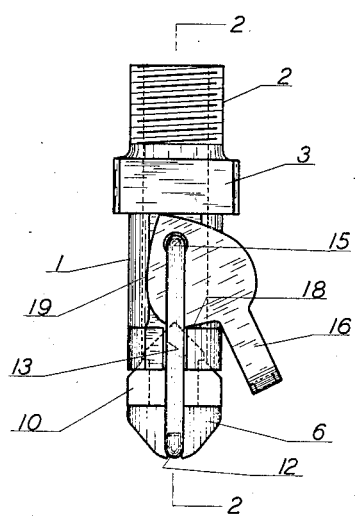

April 20, 1937. T. N. COFFELDER 2,077,460

DRAIN VALVE

Filed May 24, 1935

INVENTOR.
Thomas N. Coffelder
BY William B. Jaspert
ATTORNEY.

Patented Apr. 20, 1937

2,077,460

UNITED STATES PATENT OFFICE 2,077,460

DRAIN VALVE

Thomas N. Coffelder, Pittsburgh, Pa.

Application May 24, 1935, Serial No. 23,208

2 Claims. (Cl. 137—34.2)

This invention relates to drain valves for radiators, and the present invention is an improvement on a drain valve structure disclosed in a co-pending application serially numbered 2,262 filed by me January 17, 1935.

In accordance with the present invention, it is proposed to construct a drain valve which eliminates the structure type pet cock and thereby the annoyance incident to the opening and closing of that form of conventional valve.

It is among the objects of the present invention to provide a drain valve for radiators of simple, compact construction having the valve element disposed beneath the outlet conduit, which valve member is operative by means of a cam lever to completely open or close the outlet orifice by a single stroke of the lever mechanism.

Another object of the invention is to so construct the cam lever mechanism that the action of the cam will open the drain valve by pulling the lever upward which can be accomplished by a simple wire or rod connection to extend into an accessible space adjacent the vehicle engine and which, upon a downward pressure exerted on the lever, will close the valve.

A further object of the invention is the provision of suitable aligning means for maintaining the valve element in register with the drain outlet, and also means for assuring an efficient sealing of the drain outlet when the valve is closed.

Figure 2:
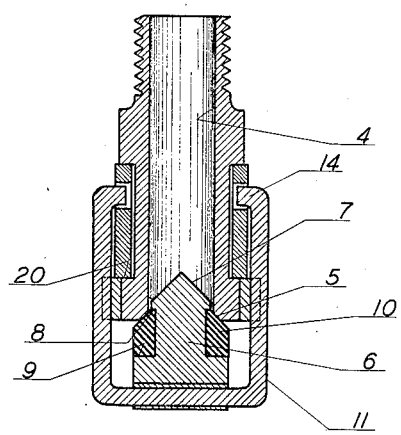
Figure 3:
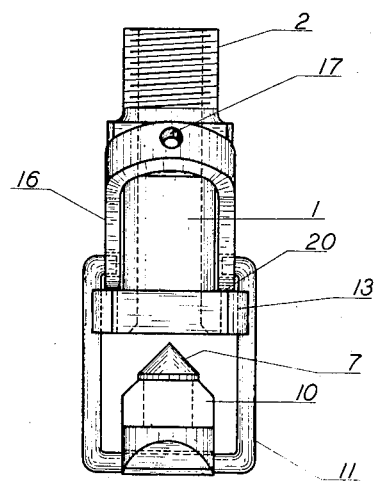

These and other objects of the invention will become more apparent from a consideration of the accompanying drawing constituting a part hereof in which like reference characters designate like parts and in which:

Fig. 1 is a side elevational view of a radiator drain valve embodying the principles of this invention;

Fig. 2 a vertical cross-sectional view taken along the line 2—2, Fig. 1;

Fig. 3 a front elevational view showing the valve in open position; and

Figure 4:
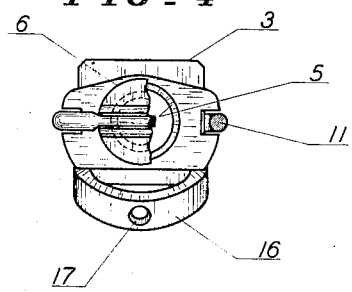

Fig. 4 a bottom elevational view partially broken away.

With reference to the several figures of the drawing, the numeral 1 designates a valve fitting preferably of non-ferrous metal such as brass or aluminum having a threaded end 2 which is screwed into the drain outlet of a radiator structure such as are commonly employed in automotive vehicles. The fitting 1 is provided with a square shoulder 3 for receiving a fastening wrench and in assembled position has its longitudinal axis vertically disposed with the outlet opening at the lowermost position of the valve.

A relatively large central bore 4 is provided to constitute an unobstructed outflow passage for draining the radiator. The lower end of the member 1 is chamfered at 5, Fig. 2, to constitute a seat for a valve generally designated by the numeral 6. The valve comprises a non-ferrous metal member tapering to a point at 7 from a head portion that forms a shoulder 8 which, with a shoulder 9, retains a rubber seat portion 10. The diameter of the head 7 is slightly less than the diameter of the bore 4 and acts as a pilot to insure proper alignment of the yielding seat element 10 with the chamfer 5. The valve 6 is mounted on a link 11 that is inserted in a slotted opening 12 which may be peened over to hold the valve rigid relative to the link. The link in turn is mounted in slots 13 provided on an enlarged portion of the fitting 1 and the ends of link 11 are turned inwardly to form trunnions 14 that are disposed in perforations 15 of a cam lever 16. Lever 16 is a yoke element having a perforation 17, Fig. 3, for receiving a rod that may extend vertically to facilitate manipulation of the lever from above the drain valve. The cam surfaces of the lever 16 are designated by numerals 18 and 19, the surface 18 contacting shoulder 20 when the valve is in its closed position, and the surface 19 contacting the shoulder 20 when the valve is in open position.

The link 11 is nowhere pivoted or otherwise attached to the fitting 1 excepting by its sliding engagement with the slots 13.

The operation of the above described drain valve is as follows:

By pressing lever 16 downward as shown in Fig. 1 the cam face 18 exerts a lifting effect on the valve member 6 that raises it against its seat 5, and the yielding characteristic of the rubber or other flexible material 10 will intimately lock the cam with its seating abutment 20. To open the valve, lever 16 is raised causing link 11 to drop thereby displacing the valve downward to open the passage. When the water flows from the valve outlet it will be diverted from the conical tip 7 of the valve thereby protecting the soft seating material such as rubber from the grit and particles of metal that may be entrained in the effluent.

The structure of the present application differs from that of my co-pending application in that it eliminates the use of springs and affords an intimate locking engagement through the use of the resilient valve seat. Also, the opening and closing by lever 16 is in the instant case effected by movement in the opposite direction to that in the earlier case wherein the downward movement of the lever will effect an opening of the valve and an upward movement its closing.

It will be apparent from the foregoing description of this invention that a drain valve constructed in accordance therewith eliminates the difficulties incident to the use of the pet cock type of valve and avoids the use of pliers.

Although one embodiment of the invention has been herein illustrated and described, it will be evident to those skilled in the art that various modifications may be made in the details of construction without departing from the principles herein set forth.

I claim:

1. A drain valve comprising a housing having a central opening and having a threaded end for mounting on the drain outlet of a radiator structure, the free end of the valve housing being provided with a chamfered seat, a valve exterior of the housing supported therein by a movable link and a cam lever being supported on but not secured to the housing, said valve comprising a stopper having a radially grooved portion for receiving a rubber seat which is interlocked therewith and having further a conical pilot for maintaining alignment of the seat of the valve and for diverting the effluent.

2. A drain valve comprising a valve housing having a threaded end, a square shoulder adjacent the threaded end and a flange at the opposite end thereof, a stopper beneath the valve supported by a link having trunnion portions at its free ends and being disposed in slots provided in the flange of the valve housing, a cam lever comprising a yoke having cam portions resting on the flange of the housing and having openings for receiving the trunnion portions of said link, the shape of the cam surfaces being designed to lift the link and close the valve by downward movement of the lever and lower the link and open the valve by upward movement of said lever.

THOMAS N. COFFELDER.